(12) United States Patent
Chokai et al.

(10) Patent No.: US 7,833,644 B2
(45) Date of Patent: Nov. 16, 2010

(54) ELECTROLYTIC MEMBRANE

(75) Inventors: Masayuki Chokai, Iwakuni (JP);
Hiroaki Kuwahara, Iwakuni (JP);
Bunsow Nagasaka, Iwakuni (JP)

(73) Assignee: Teijin Limited, Osaka (JP)

( * ) Notice: Subject to any disclaimer, the term of this patent is extended or adjusted under 35 U.S.C. 154(b) by 396 days.

(21) Appl. No.: 11/886,521

(22) PCT Filed: Mar. 16, 2006

(86) PCT No.: PCT/JP2006/305748
§ 371 (c)(1),
(2), (4) Date: Sep. 17, 2007

(87) PCT Pub. No.: WO2006/098495
PCT Pub. Date: Sep. 21, 2006

(65) Prior Publication Data
US 2008/0166619 A1    Jul. 10, 2008

(30) Foreign Application Priority Data
Mar. 17, 2005    (JP) .............................. 2005-077390

(51) Int. Cl.
*H01M 8/10* (2006.01)
*H01M 2/16* (2006.01)
*C08J 5/22* (2006.01)

(52) U.S. Cl. .................... 429/33; 429/137; 429/246; 521/27

(58) Field of Classification Search .................. 429/33, 429/137, 246; 521/27
See application file for complete search history.

(56) References Cited

U.S. PATENT DOCUMENTS

| | | | |
|---|---|---|---|
| 3,313,783 A | | 4/1967 | Iwakura et al. |
| 5,674,969 A | * | 10/1997 | Sikkema et al. .............. 528/183 |
| 6,127,059 A | * | 10/2000 | Kato .......................... 429/40 |
| 7,384,552 B2 | * | 6/2008 | Calundann et al. ..... 210/500.38 |
| 2004/0096734 A1 | * | 5/2004 | Calundann et al. .......... 429/137 |
| 2006/0093886 A1 | | 5/2006 | Aihara et al. |

FOREIGN PATENT DOCUMENTS

| | | | |
|---|---|---|---|
| JP | 693114 A | | 4/1994 |
| JP | 8-509516 A | | 10/1996 |
| JP | 08509516 A | * | 10/1996 |
| JP | 9245818 A | | 9/1997 |
| JP | 10-158213 A | | 6/1998 |
| JP | 10158213 A | * | 6/1998 |
| JP | 11116679 A | | 4/1999 |
| JP | 11510198 A | | 9/1999 |
| JP | 11515040 A | | 12/1999 |
| JP | 200080166 A | | 3/2000 |
| JP | 2002110174 A | | 4/2002 |
| JP | 2002146018 A | | 5/2002 |
| JP | 2005068396 A | | 3/2005 |
| WO | 9425506 A1 | | 11/1994 |
| WO | 02/088219 A1 | | 11/2002 |
| WO | WO 02/088219 A1 | | 11/2002 |

OTHER PUBLICATIONS

Kenji Miyatake; Synthesis of High-temperature-stable Proton-conductive Polymer Solid Electroyle film; Collected papers of polymers, vol. 59, No. 8, pp. 460-473, Partial English language translation.
J. Kerres et al.; New Sulfonated Engineering Polymers via the Metalation Route. I. Sulfonate Poly(ethersulfone) PSU Udel via Metalation-Sulfination-Oxidation; Journal of Polymer Science: Part A: Polymer chemistry, vol. 34, pp. 2421-2438 (1996).
Loon-Seng Tan et al.; Pseudo-ladder rigid-rod polymers: dihydroxy pendent benzothiazole aromatic heterocyclic polymer and copolymers; Polymer, vol. 35, No. 14, 1994, pp. 3091-3101.
C.S. Wong et al.: Electrical Conductivity of Heterocyclic Aromatic Rigid-rod and Ladder Polymers: The Effect of Ion Implantation; Polymeric Materials Science and Engineering (1991), 64, pp. 171-172.
Doetze J. Sikkema, "Design, synthesis and properties of a novel rigid rod polymer, PIPD or 'M5': high modulus and tenacity fibres with substantial compressive strength", Polymer, Elsevier Science Ltd., Nov. 1, 1998, pp. 5981-5986, vol. 39, No. 24, The Netherlands.

* cited by examiner

*Primary Examiner*—David Wu
*Assistant Examiner*—Michael M Bernshteyn
(74) *Attorney, Agent, or Firm*—Sughrue Mion, PLLC

(57) ABSTRACT

An object of this invention is to provide an electrolytic membrane excellent in ion conductivity and oxidation resistance, and this invention is directed to an electrolytic membrane formed of a polymer comprising at least one recurring unit selected from the group consisting of a recurring unit of the following formula (A),

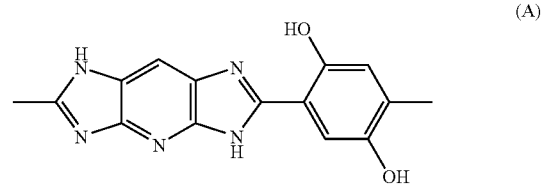

(A)

and a recurring unit of the following formula (B),

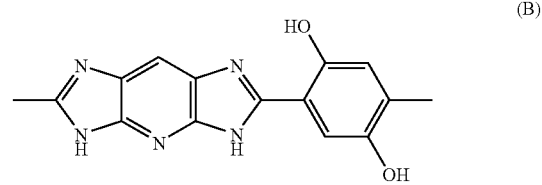

(B)

and having a reduced viscosity, measured in a methanesulfonic acid solution having a concentration of 0.5 g/100 ml at 25° C., of 0.05 to 200 dl/g, and a process for the production thereof.

9 Claims, No Drawings

ELECTROLYTIC MEMBRANE

TECHNICAL FIELD

This invention relates to an electrolytic membrane formed of a stiff heterocyclic polymer and a process for the production thereof.

BACKGROUND ART

A polymer having electrolytic groups in its polymer chain has the property of strongly bonding to specific ions and selectively transmitting cations or anions, and it is hence molded in the form of particles, fibers or a membrane and is used in various fields of electrodialysis, diffusion dialysis, a battery diaphragm and the like.

A fuel cell is a cell in which a pair of electrodes are provided on surfaces of a proton-conductive electrolytic membrane, hydrogen gas or methanol as a fuel is supplied to one electrode (fuel electrode) and oxygen gas or air as an oxidizing agent is supplied to the other electrode (air electrode) to produce an electromotive force. Further, water electrolysis refers to the production of hydrogen and oxygen by electrolyzing water with an electrolytic membrane.

Fluorine type electrolytic membranes typified by polyperfluorosulfonic acid membranes known by trade names such as Nafion (registered trademark, supplied by E.I. du Pont de Nemours and Company), Aciplex (registered trademark, supplied by Asahi Kasei Corporation and Flemion (registered trademark, supplied by ASAHI GLASS CO., LTD.), having high proton conductivity, are excellent in chemical stability and they are hence widely used as membranes for fuel cells, water electrolysis and the like.

Further, salt electrolysis refers to the production of sodium chloride, chlorine and hydrogen by electrolyzing a sodium chloride aqueous solution with an electrolytic membrane. In this case, an electrolytic membrane is exposed to chlorine and a high-temperature high-concentration sodium hydroxide aqueous solution, so that a hydrocarbon-containing membrane having poor durability against them cannot be used. As an electrolytic membrane for salt electrolysis, therefore, there is generally used a perfluorosulfonic acid membrane that has durability against chlorine and a high-temperature high-concentration sodium hydroxide aqueous solution and that has a surface into which carboxyl groups are partly introduced for preventing reverse diffusion of ions to be generated.

Meanwhile, fluorine type electrolytes typified by a polyperfluorosulfonic acid membrane have C—F bonds and hence have very high chemical stability. They are therefore used as an electrolytic membrane in/for fuel cells, water electrolysis or salt electrolysis. They are also used as a membrane for the electrolysis of halogenated hydroacid. Further, their proton conductivity is also utilized to widely apply them to humidity sensors, gas sensors and oxygen concentrators.

However, the fluorine type electrolytes have defects that they are difficult to produce and very expensive. The perfluorinated polymer based electrolytic membrane are used only in limited use fields such as a solid polymer type fuel cell for space or military use. And, it has been difficult to apply them to commercial-base use fields such as a solid Polymer Electrolyte Fuel Cell as a low-pollution power source for an automobile and the like.

As a less expensive electrolytic membrane, therefore, there has been proposed an electrolytic membrane formed by sulfonating an aromatic hydrocarbon-based polymer (for example, see Patent Documents 1, 2, 3, 4 and 5) This membrane has an advantage that it can be produced easily and at a low cost as compared with the fluorine type electrolytic membranes typified by Nafion®. However, it has a defect that its oxidation resistance is very low.

For example, Non-Patent Document 1 describes that a sulfonated polyether ether ketone or a polyether sulfone deteriorates at an ether portion adjacent to a sulfonic acid. It is therefore considered that when an electron-donating group is present near a sulfonic acid, oxidation-induced deterioration starts at that point. For improving the oxidation resistance, there has been proposed a sulfonated polyphenylene sulfone whose main chain is composed of only electron-attracting groups and aromatic rings (Patent Document 6). There has been also proposed a sulfonated polysulfone having a sulfonic acid introduced to a portion adjacent to a sulfone group (Non-Patent Document 2).

According to Patent Document 7, however, not only the aromatic hydrocarbon-based polymer electrolytic membrane is deteriorated by oxidation, but also a sulfone group as a proton-conductive substituent bonding directly to an aromatic ring is eliminated under a strong acid at a high-temperature to decrease the ion conductivity, which is said to be a factor for the deterioration as well. In the sulfonated polyphenylenesulfone or sulfonated polysulfone described in Patent Document 6 or Non-Patent Document 2, the deterioration caused by the elimination of a sulfone group is inevitable. It is therefore undesirable that the proton-conductive substituent is a sulfonic acid, and Patent Document 7 proposes that an alkylsulfonic acid be used in place of the sulfonic acid. This proposal is effective for overcoming a decrease in the ion conductivity caused by the elimination of the sulfonic acid. Since, however, the main chain of an aromatic polymer used contains an electron-donating group, the membrane thereof is poor in oxidation resistance.

Meanwhile, it is expected that an azole polymer, which is excellent in heat resistance and chemical resistance, will make an electrolytic membrane for a fuel cell. As an azole polymer having proton conductivity, for example, there has been proposed a sulfonated azole polymer (Patent Document 8). However, a sulfone group introduced onto an aromatic ring of a polymer as a raw material is liable to undergo a desulfonation reaction due to an acid or heat as described above, and it cannot be said that such a polymer has sufficient durability against use as an electrolytic membrane for a fuel cell. An azole polymer having a hydroxyl group and a process for the production thereof are reported, for example, in Non-Patent Document 3. Further, there is a report of conductivity measurement of the ion implantation product of an azole polymer membrane having a hydroxyl group (Non-Patent Document 4).

In none of these Documents, however, a hydroxyl group has not been regarded as a functional group to conduct ions, and these materials have no sufficient durability against conditions of a fuel cell and use fields.

As a material to be used mainly for fibers, further, there has been proposed a stiff rod polymer based on pyridobisimidazole, which is similar to the above materials (Patent Document 9).

(Patent Document 1) JP-A 6-93114
(Patent Document 2) JP-A 9-245818
(Patent Document 3) JP-A 11-116679
(Patent Document 4) JP-A 11-510198
(Patent Document 5) JP-A 11-515040
(Patent Document 6) JP-A 2000-80166
(Patent Document 7) JP-A 2002-110174
(Patent Document 8) JP-A 2002-146018
(Patent Document 9) WO94/025506

(Non-Patent Document 1) Collected papers of polymers, Vol. 59, No. 8, pages 460-473
(Non-Patent Document 2) Journal of Polymer Science: Part A: Polymer Chemistry, Vol. 34, 2421-2438 (1996)
(Non-Patent Document 3) Polymer, 35, (1994) 3091
(Non-Patent Document 4) Polymeric Materials Science and Engineering (1991), 64, 171-2

DISCLOSURE OF THE INVENTION

It is an object of this invention to provide an electrolytic membrane excellent in ion conductivity and oxidation resistance. It is another object of this invention to provide a membrane that is excellent in isotropy in the in-plane direction and is useful as a polymer electrolytic membrane for a fuel cell. It is further another object of the present invention to provide a membrane/electrode junction material having the above membrane, and a fuel cell.

The present inventor has made studies for a novel polymer electrolytic membrane that is free of the defects of perfluorinated polymer based electrolytic membranes which are difficult to produce and expensive, and that is free of the defects of sulfonic acid branched polymer electrolytic membranes having problems with regard to oxidation resistance. As a result, it has been found that a polymer obtained by reacting a specific aromatic amine with an aromatic dicarboxylic acid is excellent in ion conductivity and oxidation resistance and is excellent as a material for a polymer electrolytic membrane.

Further, the present inventor has found that a casting method or pressing method can overcome the defect of the above polymer that a membrane is obtained as a strongly oriented easily breakable membrane due to the high crystalization when it is formed by general extrusion. The present invention has been accordingly completed from the finding.

That is, this invention is an electrolytic membrane formed of a polymer comprising at least one recurring unit selected from the group consisting of a recurring unit of the following formula (A),

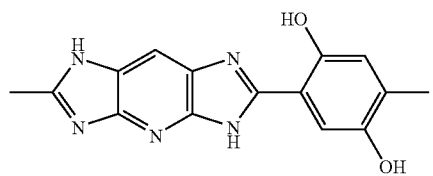

and a recurring unit of the following formula (B),

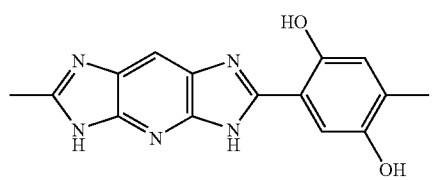

and having a reduced viscosity, measured in a methanesulfonic acid solution having a concentration of 0.5 g/100 ml at 25° C., of 0.05 to 200 dl/g.

Further, this invention is a process for the production of an electrolytic membrane, which comprises the steps of
(1) preparing a dope containing a polymer and a solvent, the polymer comprising at least one recurring unit selected from the group consisting of a recurring unit of the following formula (A),

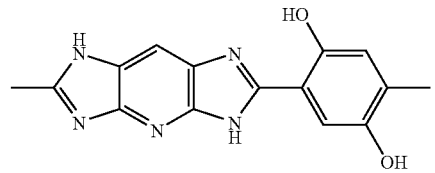

and a recurring unit of the following formula (B),

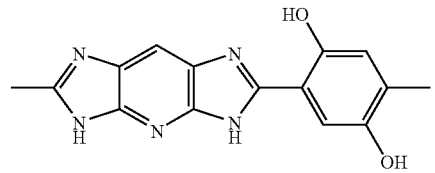

and having a reduced viscosity, measured in a methanesulfonic acid solution having a concentration of 0.5 g/100 ml at 25° C., of 0.05 to 200 dl/g, and
(2) forming a membrane from the dope by a casting method or a pressing method.

Further, this invention includes a membrane/electrode junction material formed of the above membrane and catalyst electrodes arranged on the two surfaces thereof, one catalyst electrode on one surface and the other catalyst electrode on the other surface. Further, it includes a fuel cell having the above membrane/electrode junction material.

BEST MODE FOR CARRYING OUT THE INVENTION

<Electrolytic Membrane>

The electrolytic membrane of this invention is formed of a polymer (to be sometimes referred to as "polymer (X)" hereinafter) comprising at least one recurring unit selected from the group consisting of a recurring unit of the following formula (A),

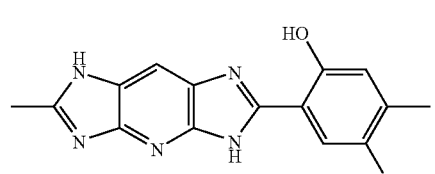

and a recurring unit of the following formula (B),

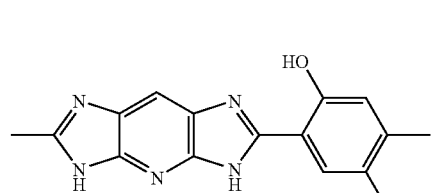

and having a reduced viscosity, measured in a methanesulfonic acid solution having a concentration of 0.5 g/100 ml at 25° C., of 0.05 to 200 dl/g.

The value of reduced viscosity of the polymer (X), measured in a methanesulfonic acid solution having a concentration of 0.5 g/100 ml at 25° C., is 0.05 to 200 dl/g, preferably 1.0 to 100 dl/g, more preferably 10 to 80 dl/g.

In the electrolytic membrane of this invention, the degree of orientation (f) in the in-plane direction, calculated on the basis of the following equations (I) and (II), $$<\cos^2\phi> = \frac{\int_0^{\frac{\pi}{2}} F(\phi)\sin\phi\cos^2\phi \, d\phi}{\int_0^{\frac{\pi}{2}} F(\phi)\sin\phi \, d\phi} \quad (I)$$

$$f = \frac{1}{2}(3<\cos^2\phi> -1) \quad (II)$$

wherein φ is an angle that an X-ray diffraction plane forms with an orientation axis and F is a diffraction intensity, is preferably 0 to 0.3, more preferably 0 to 0.1. Further, the degree of orientation (f) in the thickness direction, similarly calculated on the basis of the above equations (I) and (II), is preferably 0.5 to 1, more preferably 0.6 to 1.

In the above equations (I) and (II), the degree of orientation (f) can be determined by wide-angle X-ray diffraction (WAX) measurement. The WAX measurement is carried out under conditions (Thru view) where X ray enters a film in the direction perpendicular to an MD axis (casting direction) and perpendicular to the film surface and under conditions (Edge view) where X ray enters the film in the direction perpendicular to the MD axis and in parallel with the film surface, and for the estimation of degree of orientation f, Hermans' orientation function is employed.

The degree of orientation f in the in-plane direction can be obtained by determining a root mean square average of direction cosine to MD on a (110) diffraction plane in Thru view according to the equation (I) and calculating the degree of orientation f (expression (II)) from it. Further, the degree of orientation f in the thickness direction can be obtained by determining a root mean square average of direction cosine to the direction of a normal line of the film surface on a (200) diffraction plane in Edge view according to the equation (I) and calculating the degree of orientation f (expression (II)) from it.

The thickness of the electrolytic membrane is preferably 10 to 200 μm, more preferably 30 to 100 μm. The electrolytic membrane preferably has a thickness of 10 μm or more for accomplishing membrane strength durable against practical use, and it preferably has a thickness of 200 μm or less for a decrease in membrane resistance, that is, an improvement in electricity-generating performance. In the casting method, the thickness can be controlled on the basis of a dope concentration or an application thickness on a substrate. In the pressing method, it can be controlled on the basis of a dope concentration or a pressure to be exerted.

In the electrolytic membrane of this invention, the ion conductivity is preferably 0.01 S/cm or more, more preferably 0.05 to 1.0 S/cm. The ion conductivity can be determined by carrying out 4-terminal impedance measurement of a sample membrane with an electrochemical impedance measuring apparatus.

The electrolytic membrane of this invention is not soluble in a Fenton's reagent having a temperature of 60° C. under heat when immersed therein for 30 minutes, and it can be used as an electrolytic membrane for a fuel cell. The Fenton's reagent as used in this invention refers to a solution of 1.9× $10^{-3}$ part by weight of iron sulfate heptahydrate in 20 parts by weight of a 30% by weight hydrogen peroxide aqueous solution.

(Production of Polymer (X))

The polymer (X) can be produced according to the method described in Polymer, 39, (1998) 5981.

That is, it can be produced by reacting at least one member selected from the group consisting of an aromatic amine of the following formula (C),

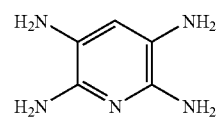

(C)

and strong acid salts thereof with an aromatic dicarboxylic acid of the following formula (D),

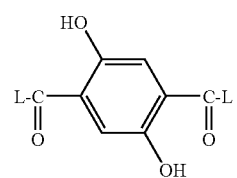

(D)

wherein L is OH, a halogen atom or a group represented by OR and R is an aromatic group having 6 to 20 carbon atoms.

Strong acids of the strong acid salts of the aromatic amine of the formula (C) include hydrochloric acid, phosphoric acid and sulfuric acid.

The halogen atom represented by L in the formula (D) includes a fluorine atom, a chlorine atom, a bromine atom and the like. The aromatic group represented by R includes phenyl, toluyl, benzyl, naphthalenyl and the like. One or more hydrogen atoms of the aromatic group represented by R may be independently substituted with a halogen group such as fluorine, chlorine, bromine or the like; an alkyl group having 1 to 6 carbon atoms such as methyl, ethyl, propyl, hexyl or the like, a cycloalkyl group having 5 to 10 carbon atoms such as cyclopentyl, cyclohexyl or the like; or an alkoxycarbonyl group such as methoxycarbonyl, ethoxycarbonyl or the like.

Preferably, the molar amounts of these monomers (reactants) simultaneously satisfy the following expression (1), $$0.8 \leq (c)/(d) \leq 1.2 \quad (1)$$

wherein (c) is a molar amount of a charged aromatic amine of the formula (C) and (d) is a molar amount of a charged aromatic dicarboxylic acid of the formula (D). When (c)/(d) is smaller than 0.8 or larger than 1.2, it is sometimes difficult to obtain a polymer having a sufficient polymerization degree. The lower limit of (c)/(d) is properly 0.9 or more, more preferably 0.93 or more, still more preferably 0.95 or more. Further, the upper limit of (c)/(d) is properly 1.1 or less, more preferably 1.07 or less, still more preferably 1.05 or less. It can be therefore said that the optimum range of (c)/(d) in this invention is $0.95 \leq (c)/(d) \leq 1.05$.

For the reaction, there can be employed any one of a reaction that is carried out in a solvent and a solvent-less reaction that is carried out by melting under heat, while it is preferred to carry out the reaction under heat with stirring in a reaction solvent to be described later. The reaction temperature is preferably 50° C. to 500° C., more preferably 100° C. to 350° C. That is because the reaction does not proceed when the temperature is lower than 50° C. or because a side reaction such as decomposition is liable to take place when the temperature is higher than 500° C. Although differing depending upon a temperature condition, the reaction time period is generally 1 hour to several tens of hours. The reaction can be carried out under elevated pressure or under reduced pressure.

Generally, the reaction can proceed in the absence of a catalyst, while an ester exchange catalyst may be used as required. The ester exchange catalyst for use in this invention includes antimony compounds such as antimony trioxide, tin compounds such as stannous acetate, tin chloride, tin octylate, dibutyltin oxide and dibutyltin diacetate, alkaline earth metal salts such as calcium acetate, alkali metal salts such as sodium carbonate and potassium carbonate and phosphorus acids such as diphenyl phosphite, triphenyl phosphite and the like. In the reaction, a solvent can be used as required. The solvent preferably includes 1-methyl-2-pyrrolidone, 1-cyclohexyl-2-pyrrolidone, dimethylacetamide, dimethyl sulfoxide, diphenyl ether, diphenyl sulfone, dichloromethane, chloroform, tetrahydrofuran, o-cresol, m-cresol, p-cresol, phosphoric acid, polyphosphoric acid, etc., while the solvent shall not be limited to these. For preventing the decomposition and coloring of a polymer, desirably, the reaction is carried out in a dry inert gas atmosphere.

(Formation of Membrane)

When the polymer (X) is used for an electrolyte in a fuel cell, generally, it is used in the state of a membrane. The polymer (X) is crystalline, and when a membrane is formed by extruding a high-concentration dope from a die, an obtained membrane is highly oriented in the in-plane direction and is easily breakable, so that such a membrane is not suitable for use as an electrolyte. When a membrane is formed from the polymer (X), the membrane is formed preferably by (i) a casting method or (ii) a pressing method.

(Casting Method)

The casting method refers to a method in which a polymer solution (dope) containing the polymer (X) and a solvent is cast on a substrate such as a glass substrate and the solvent is removed to form a membrane.

The solvent is not specially limited so long as it can dissolve the polymer (X) and can be removed thereafter. The solvent can be selected from aprotic solvents such as N,N-dimethylacetamide, N,N-dimethylformamide, dimethyl sulfoxide, N-methyl-2-pyrrolidone, hexamethylphosphoneamide, etc., and strong acids such as polyphosphoric acid, methanesulfonic acid, sulfuric acid, trifluoroacetic acid, etc.

A mixture of a plurality of these solvents may be used as far as they are mixable. As a means for improving the solubility, a mixture prepared by adding a Lewis acid such as lithium bromide, lithium chloride, aluminum chloride or the like to an organic solvent may be used as a solvent. The concentration of the polymer (X) in the dope is preferably 0.1 to 8% by weight. When it is too low, the formability is poor. When it is too high, the workability of the dope is poor. In the solution casting method, when the concentration of the polymer (X) in the dope is adjusted to the predetermined range, there can be obtained a membrane having a low degree of orientation in the in-plane direction.

As a casting method, it is preferred to employ a method in which a dope is cast onto a support with a doctor blade, a bar coater, an applicator or the like, a solvent is washed off and a film is dried. The drying temperature employable is 0° C. to 200° C., preferably 20° C. to 150° C., more preferably 50° C. to 80° C.

(Pressing Method)

The polymer (X) has high crystallinity, and when a membrane is formed by general extrusion, there can be obtained no membrane having isotropy in the in-plane direction. Therefore, a dope containing the polymer (X) and a solvent is sandwiched between substrates and a membrane is formed by exerting a pressure, whereby there can be obtained a membrane having isotropy in the in-plane direction. The solvent can be selected from those in the casting method. The concentration of the polymer (X) in the dope is preferably 0.1 to 30% by weight, more preferably 0.5 to 8% by weight. The pressure is preferably 0.01 to 1,000 MPa, more preferably 1 to 10 MPa. During the membrane formation, preferably, heating is carried out. The heating temperature is preferably 100 to 300° C., more preferably 130 to 250° C.

(Membrane/Electrode Junction Material)

The membrane/electrode junction material of this invention has catalyst electrodes on both surfaces of the electrolytic membrane of this invention, one catalyst electrode on one surface and the other catalyst electrode on the other surface. The catalyst electrode refers to an electrode in which fine particles of a catalyst metal are supported on an electrically conductive material. The catalyst metal can be selected from any metals that promote an oxidation reaction of hydrogen and a reducing reaction of oxygen. Examples thereof include platinum, gold, silver, palladium, iridium, rhodium, ruthenium, iron, cobalt, nickel, chromium, tungsten, manganese, vanadium and alloys of these. In particular, platinum is used in many cases. The catalyst metal generally has a particle diameter of 10 to 300 angstroms.

The electrically conductive material can be any material so long as it is an electron-conductive substance. The electrically conductive material includes various metals and carbon materials. The carbon materials include carbon blacks such as furnace black, channel black, acetylene black, etc., activated carbon, graphite and the like. These are used singly or as a mixture. The amount of the catalyst metal supported is preferably 0.01 to 10 $mg/cm^2$ in a state where the electrodes are formed.

As a method for supporting the catalyst metal on the electrically conductive material, there is employed a method in which the catalyst metal is deposited on the electrically conductive material surface by a reducing method or a method in which the catalyst metal is suspended in a solvent and this suspension is applied to the electrically conductive material surface.

(Fuel Cell)

The fuel cell of this invention is constituted in a manner that a grooved collector called a separator for forming a fuel pathway or an oxidizing pathway is arranged outside the membrane/electrode junction material to form a single cell, and a plurality of such cells are stacked through a cooling plate and the like.

EXAMPLES

This invention will be more specifically explained below with reference of Examples and Comparative Examples, while the present invention shall not be limited by these Examples. Measurement values in the following Examples were obtained by the following methods.

(Reduced Viscosity)

Measured in a methanesulfonic acid aqueous solution having a concentration of 0.5 g/100 ml at 25° C.

(Ion Conductivity)

A sample membrane was subjected to 4-terminal impedance measurement in a frequency region of 0.1 Hz to 65 kHz with an electrochemical impedance measuring apparatus (SI1287, supplied by Solartron) and measured for ion conductivity. The measurement was carried out while a sample having the form of a 1.5 cm×3 cm strip was maintained at 75° C. in an atmosphere having a humidity of 90%.

(Oxidation Resistance)

A 0.5 mg sample membrane was immersed in a Fenton's reagent having a temperature of 60° C. under heat (containing 40 ppm of iron) and a time period which a sample took to be dissolved in the Fenton's reagent was determined. The Fenton's reagent was prepared by adding 1.9 mg of iron sulfate heptahydrate to 20 g of a 30 wt % hydrogen peroxide aqueous solution.

(Degree of Orientation)

For wide angle X-ray diffraction (WAX) measurement, monochromatized $CuK_\alpha$ radiation from X-ray generator (ROTA FLEX RU200B, Rigaku) with a confocal mirror was used, and X-ray diffraction patterns were recorded as the imaging plate at a camera length of 95 mm by applying the transmission method. For a WAX measurement sample, a film was cut in the form of a strip having a length (//MD) of 6.5 mm and a width of 2 mm such that MD (casting direction) axes were aligned, and these cut pieces were stacked to prepare a 1.5 mm thick stack sample. As layout conditions of this stack sample in the WAX measurement, there were employed a condition (Thru view) under which X-ray entered in the direction perpendicular to the MD axis and perpendicular to the film surface, and a condition (Edge view) under which X-ray entered in the direction perpendicular to the MD axis and in parallel with the film surface. For estimation of the degree of orientation f, Hermans' orientation function was employed. The degree of orientation f in the in-plane direction was obtained by determining a root mean square average of direction cosine to MD on a (110) diffraction plane in Thru view according to the equation (I) and calculating the degree of orientation f (expression (II)) from it. Further, the degree of orientation f in the thickness direction was obtained by determining a root mean square average of direction cosine to the direction of a normal line of the film surface on a (200) diffraction plane in Edge view according to the equation (I) and calculating the degree of orientation f (expression (II)) from it.

$$<\cos^2\phi> = \frac{\int_0^{\frac{\pi}{2}} F(\phi)\sin\phi\cos^2\phi\, d\phi}{\int_0^{\frac{\pi}{2}} F(\phi)\sin\phi\, d\phi} \quad (I)$$

$$f = \frac{1}{2}(3<\cos^2\phi> -1) \quad (II)$$

wherein $\phi$ is an angle that an X-ray diffraction plane forms with an orientation axis and F is a diffraction intensity.

(Evaluation of Single Cell Performance of Fuel Cell)

A membrane/electrode junction material was incorporated into an evaluation cell, and a fuel cell was evaluated for output performance. As reactant gases, hydrogen/oxygen were used, and under a pressure of one atmospheric pressure, each was passed through a water bubbler at 70° C. to wet them and then fed to the evaluation cell. Regarding gas flow rates, that of hydrogen was set at 60 ml/minute and that of oxygen was set at 40 ml/minute, and the cell temperature was set at 75° C. The battery was evaluated for output performance with an H201B battery charge/discharge unit (supplied by HOKUTO DENKO CORPORATION).

Referential Example 1

Monomer Synthesis 17.772 Parts by weight of 2,3,5,6-tetraaminopyridine trihydrochloride monohydrate was dissolved in 100 parts by weight of water deaerated with nitrogen. 13.208 Parts by weight of 2,5-dihydroxyterephthalic acid was dissolved in 137 parts by weight of a 1M sodium hydroxide aqueous solution, followed by deaeration with nitrogen. The 2,3,5,6-tetraaminopyridine trihydrochloride monohydrate aqueous solution was dropwise added to the 2,5-dihydroxyterephthalic acid disodium salt aqueous solution over 10 minutes. Then, 24.3 parts by weight of polyphosphoric acid, 35 parts by weight of water deaerated with nitrogen and 1 part by weight of acetic acid were added, and the resultant salt was recovered by filtering and dispersed in, and mixed with, 3,000 parts by weight of water deaerated with nitrogen, followed by re-filtering. Procedures of the above dispersing/mixing and filtering were repeated 3 times to give 2,3,5,6-tetraaminopyridine/2,5-dihydroxyterephthalaic acid salt.

Referential Example 2

Polymerization for Polymer 62.54 Parts by weight of polyphosphoric acid and 14.76 parts by weight of phosphorus pentoxide were added to 22.88 parts by weight of the 2,3,5,6-tetraaminopyridine/2,5-dihydroxyterephthalaic acid salt obtained in Referential Example 1, and they were stirred and mixed at 100° C. for 1 hour. Then, the mixture was temperature-increased to 140° C. while taking 2 hours, and at 140° C. it was stirred for 1 hour. Then, the reaction mixture was temperature-increased to 180° C. while taking 1 hour, and at 180° C. it was allowed to react for 5 hours to give a dope. The thus-obtained dope contained 18 parts by weight of a polymer and 82 parts by weight of polyphosphoric acid. When measured through a polarizing microscope, the dope exhibited crystallinity. The dope was re-precipitated in water and washed with water to give a polymer. The thus-obtained polymer had a reduced viscosity of 15 dl/g.

Example 1

Preparation of Press Membrane

The dope obtained in Referential Example 2 was pressed at 200° C. with a heat-press machine while it was sandwiched between fluorine resin membranes, and the press product was washed with water to give a 100 μm thick membrane. Table 1 shows results of the ion conductivity measurement and oxidation resistance test of this membrane.

Example 2

Preparation of Cast Membrane

1 Part by weight of the polymer obtained in Referential Example 2 was dissolved in 150 parts by weight of methanesulfonic acid to prepare a dope. The dope was cast on a membrane formed of Teflon (registered trademark) and then the cast dope was washed with water to give a 10 μm thick membrane. Table 1 shows the ion conductivity and oxidation resistance of the thus-obtained membrane.

Example 3

(Membrane/Electrode Junction Material, Fuel Cell)

The dope of Example 2 was added to carbon supporting 40% by weight of platinum in a manner that the weight ratio of the carbon supporting the platinum and the polymer was 2:1, and the mixture was uniformly dispersed to prepare a paste. The paste was applied to both the surfaces of the electrolytic membrane obtained in Example 2, washed with water and dried to obtain a membrane/electrode junction material. The membrane/electrode junction material supported 0.25 mg/cm$^2$ of platinum. This junction material was subjected to the evaluation of single cell performance of fuel cell to show an output of 40 mW.

Comparative Example 1

The dope obtained in Referential Example 2 was extruded through a 600 μm slit to attempt to form a membrane and the thus-obtained product was washed with water. There was only obtained an approximately 80 μm thick membrane-like product that was fragile in the layer direction, and its ion conductivity was immeasurable. Table 1 shows the oxidation resistance of the membrane-like product.

Comparative Example 2

(Monomer Synthesis)

7 Parts by weight of 4,6-diamino-1,3-benzenediol dihydrochloride was dissolved in 33 parts by weight of water deaerated with nitrogen. 6.180 Parts by weight of 2,5-dihydroxyterephthalic acid was dissolved in 64 parts by weight of a 1M sodium hydroxide aqueous solution, followed by deaeration with nitrogen. The 4,6-diamino-1,3-benzenediol dihydrochloride aqueous solution was dropwise added to the 2,5-dihydroxyterephthalic acid disodium salt aqueous solution over 10 minutes to form a white precipitate of 4,6-diamino-1,3-benzenediol/2,5-dihydroxyterepthalic acid salt. In this case, the reaction temperature was maintained at 90° C. The resultant salt was recovered by filtering and dispersed in, and mixed with, 3,000 parts by weight of water deaerated with nitrogen, followed by re-filtering. Procedures of the above dispersing/mixing and filtering were repeated 3 times.

(Polymerization for Polymer)

43.3 Parts by weight of polyphosphoric acid, 15.0 parts by weight of phosphorus pentoxide and 0.1 part by weight of tin chloride were added to 13.1 parts by weight of the above-obtained 2,5-dihydroxyterepthalic acid salt of 4,6-diamino-1,3-benzenediol, and they were stirred and mixed at 80° C. for 1 hour. Then, the mixture was temperature-increased to 150° C. while taking 2 hours, and at 150° C. it was stirred for 6 hours. Then, the reaction mixture was temperature-increased to 200° C. while taking 1 hour, and at 200° C. it was allowed to react for 1 hour to give a dope. The thus-obtained dope contained 10.3 parts by weight of a polymer and 61.1 parts by weight of polyphosphoric acid. When measured through a polarizing microscope, the dope exhibited crystallinity. The dope was re-precipitated in water and washed with water to give a polymer. The thus-obtained polymer had a reduced viscosity of 15 dl/g.

(Preparation of Cast Film)

The polymer was dissolved in methanesulfonic acid to obtain a solution having a polymer concentration of 0.5 g/dl. The solution was cast on a membrane formed of Teflon (registered trademark) and then the casting product was washed with water to give a 12 μm thick cast membrane. Table 1 shows the ion conductivity and oxidation resistance of the thus-obtained membrane.

TABLE 1

| | Ion conductivity (S/cm) | Oxidation resistance (minute) | Orientation degree (in-plane direction) | Orientation degree (thickness direction) |
|---|---|---|---|---|
| Ex. 1 | 0.01 | Not dissolved | 0 | 0.61 |
| Ex. 2 | 0.08 | Not dissolved | 0 | 0.73 |
| CEx. 1 | Immeasurable | Not dissolved | 0.6 | — |
| CEx. 2 | 0.021 | 30 | 0 | 0.71 |

Ex. = Example, CEx. = Comparative Example

EFFECT OF THE INVENTION

The electrolytic membrane of this invention is excellent in ion conductivity and oxidation resistance. Further, the electrolytic membrane of this invention is excellent in isotropy in the in-plane direction. According to the production process of this invention, an electrolytic membrane having excellent in in-plane isotropy can be produced from the polymer (X) that is highly crystalline.

INDUSTRIAL UTILITY

The electrolytic membrane of this invention can be used in/for a fuel cell, water electrolysis, halogenated hydroacid electrolysis, salt electrolysis, an oxygen condenser, a humidity sensor, a gas sensor, and the like.

The invention claimed is:
1. An electrolytic membrane formed of a polymer comprising at least one recurring unit selected from the group consisting of a recurring unit of the following formula (A),

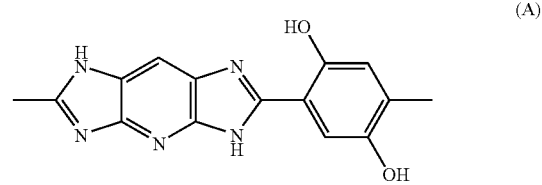

and a recurring unit of the following formula (B),

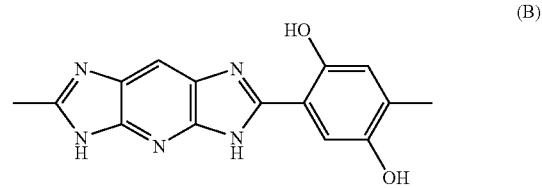

and having a reduced viscosity, measured in a methanesulfonic acid solution having a concentration of 0.5 g/100 ml at 25° C., of 0.05 to 200 dl/g,
and having a degree (f) of orientation in the in-plane direction, calculated on the basis of the following expressions (I) and (II), of 0 to 0.3 and a degree (f) of orientation in the thickness direction, calculated on the basis of the expressions (I) and (II), of 0.5 to 1, $$<\cos^2\phi> = \frac{\int_0^{\frac{\pi}{2}} F(\phi)\sin\phi\cos^2\phi\, d\phi}{\int_0^{\frac{\pi}{2}} F(\phi)\sin\phi\, d\phi} \quad (I)$$

$$f = \frac{1}{2}(3<\cos^2\phi> -1) \quad (II)$$

wherein φ is an angle that an X-ray diffraction plane forms with an orientation axis and F is a diffraction intensity.

2. The membrane of claim 1, which has a thickness of 10 to 200 μm.

3. The membrane of claim 1, wherein the polymer has a reduced viscosity of 10 to 80 dl/g.

4. The membrane of claim 1, which has an ion conductivity of 0.01 S/cm or more.

5. The membrane of claim 1, which is insoluble in a Fenton's reagent having a temperature of 60° C. under heat.

6. A process for the production of an electrolytic membrane of claim 1, which comprises the steps of
(1) preparing a dope containing a polymer and a solvent, the polymer comprising at least one recurring unit selected from the group consisting of a recurring unit of the following formula (A),

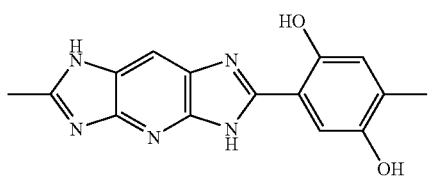
(A)

and a recurring unit of the following formula (B),

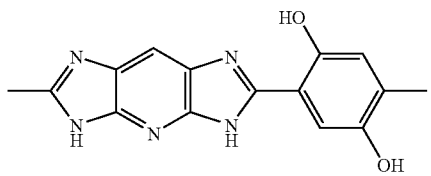
(B)

and having a reduced viscosity, measured in a methanesulfonic acid solution having a concentration of 0.5 g/100 ml at 25° C., of 0.05 to 200 dl/g, and
(2) forming a membrane from the dope by a casting method or a pressing method.

7. The process of claim 6, which comprises the step of preparing a polymer by reacting at least one member selected from the group consisting of an aromatic amine of the following formula (C),

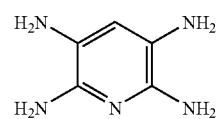
(C)

and strong acid salts thereof with an aromatic dicarboxylic acid of the following formula (D),

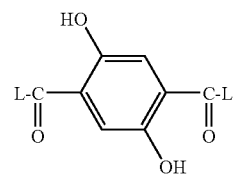
(D)

wherein L is OH, a halogen atom or a group represented by OR and R is an aromatic group having 6 to 20 carbon atoms.

8. A membrane/electrode junction material comprising the membrane recited in claim 1 and catalyst electrodes on both surface thereof, one catalyst electrode on one surface and the other catalyst electrode on the other surface.

9. A fuel cell having the membrane/electrode junction material recited in claim 8.

* * * * *